Figure 1:
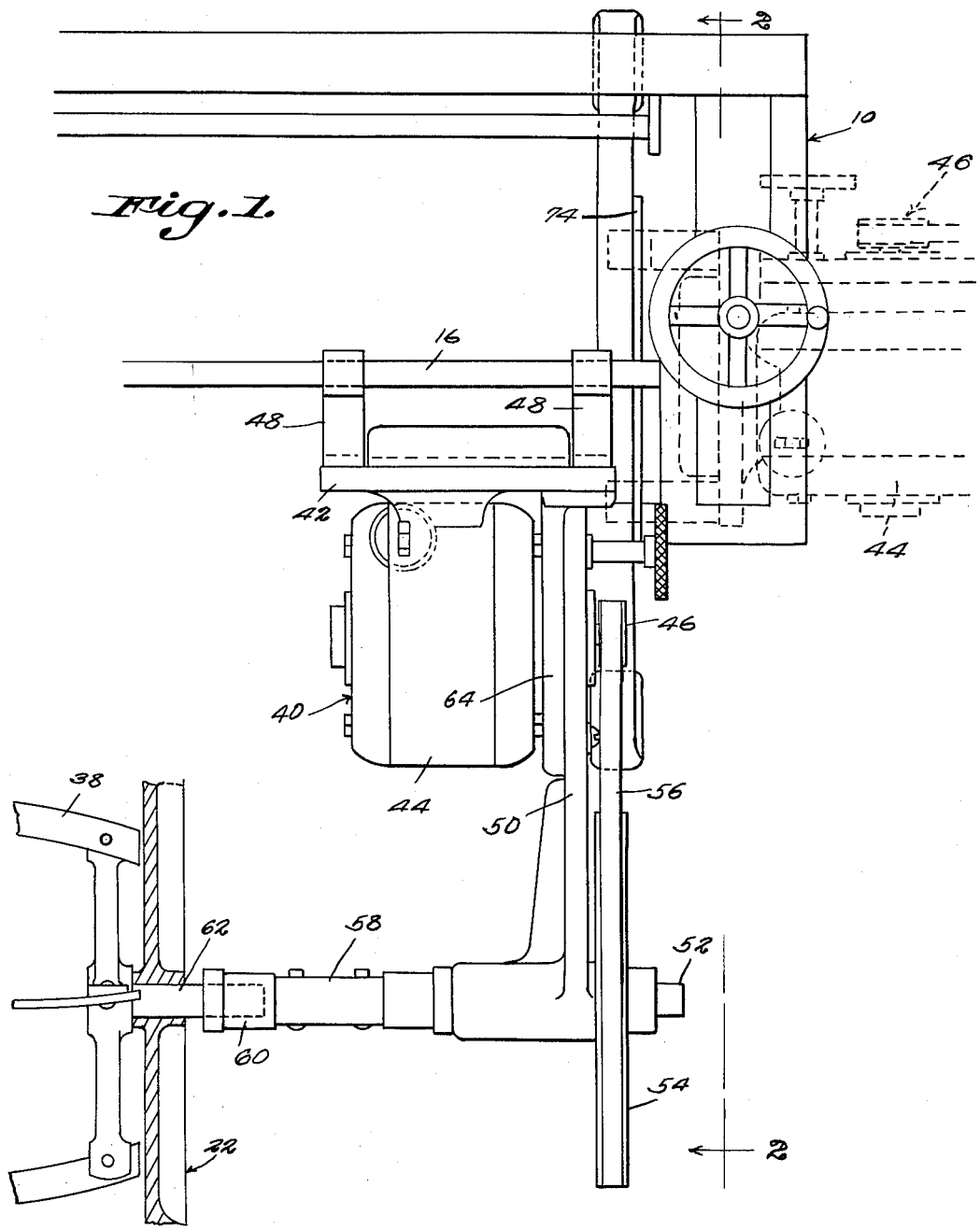

United States Patent Office 2,722,780
Patented Nov. 8, 1955

2,722,780

BACK LAPPING ATTACHMENT FOR LAWN MOWER SHARPENING MACHINE

William V. Smith, Greenville, Ill.

Application July 18, 1952, Serial No. 299,548

1 Claim. (Cl. 51—26)

This invention relates to a back lapping attachment for a lawn mower sharpening machine and has for its primary object to facilitate the back lapping of the reel blades of conventional lawn mower.

Another object is to enable the operator of a lawn mower grinding machine to back lap the reel blades without removing the lawn mower from the grinding machine.

The above and other objects may be attained by employing this invention which embodies among its features a prime mover adapted to be detachably mounted on the conventional track along which the grinding wheel is guided during the sharpening of a lawn mower, and means carried by the track and operatively connected with the prime mover for detachable connection to the lawn mower reel to enable the reel to be back lapped when the prime mover is set into operation. "Back lapping" is meant to define a sharpening of the cutting edges of the rotating lawn mower reel blades in a direction opposite to the rotation of the mower reel conventionally had during the normal use of the lawn mower which in itself will effect a sharpening of the mower reel blades.

Other features include a base, a prime mover mounted on the base, and an arm mounted on the base for movement in an arcuate path which lies concentric about the drive shaft of the prime mover, a chuck carried by the arm for movement in an arcuate path concentric about the axis of the drive shaft of the prime mover from a position in which it aligns with the axis of the reel of a lawn mower mounted in the grinding machine to an inactive position in which it lies out of alignment with said axis, and hooks carried by the base for engagement with the track rail of the grinding machine whereby the back lapping attachment will be accurately positioned selectively to the reel of the lawn mower.

Figure 2:
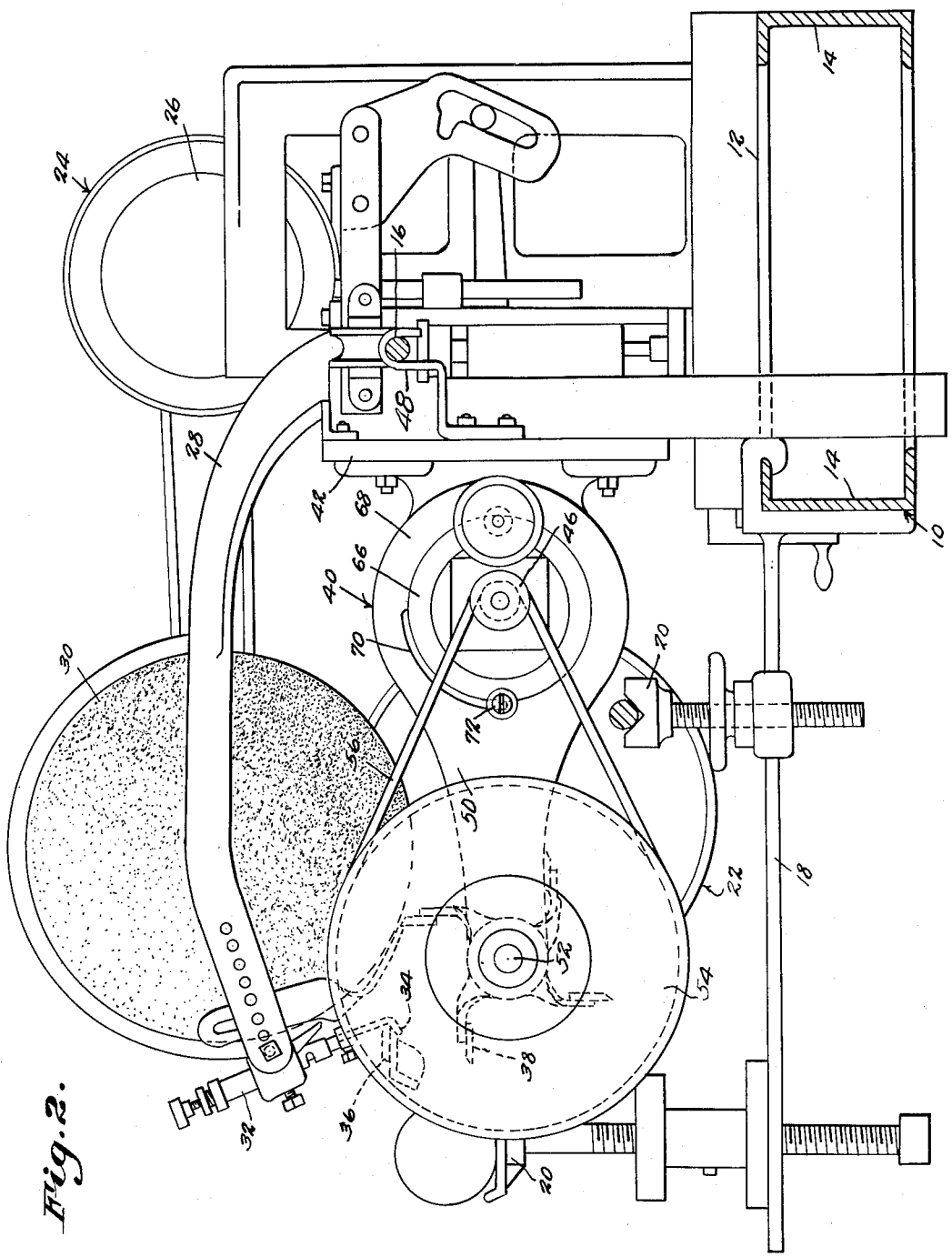

Referring to the drawings:

Figure 1 is a fragmentary top plan view of a lawn mower sharpening machine showing this improved back lapping attachment in operative position thereon, and Fig. 2 is a sectional view taken substantially on the line 2—2 of Fig. 1.

Referring to the drawings in detail a lawn mower grinding machine designated generally 10, conventionally comprises a bed frame 12, having spaced parallel side rails 14, and carrying a track rail 16. Supporting arms 18 are detachably connected to one of the side rails 14 and extend outwardly therefrom, as will be readily understood upon reference to the drawings. The arms 18 carry supporting members 20 on which a lawn mower, designated generally 22, is supported in an inverted position to one side of the machine with its reel below the track rail 16. Mounted on the track rail 16 for movement longitudinally thereof is a carriage designated generally 24, which includes a prime mover 26, and a laterally extending arm 28, carrying remote from the track rail 16 a grinding wheel 30 which is adapted to be moved longitudinally relative to the track rail in a substantially rectilinear path which lies substantially parallel to the axis of the grinding wheel. Carried by the end of the arm 28, remote from the track rail 16 and adjacent to the periphery of the grinding wheel 30 is an adjustable support 32, carrying a hook 34 which is adapted to engage the bed knife 36 of the lawn mower 22 in order to accurately locate the reel blades 38 of the reel of the lawn mower 22 relative to the grinding wheel 30.

The structure thus far described is conventional and forms no part of this invention, except in combination therewith.

This improved back lapping attachment designated generally 40 comprises a base plate 42 upon which is mounted a prime mover 44 having a drive shaft carrying a drive pulley 46 which rotates about an axis which lies parallel with the axis of the grinding wheel 30. The base plate 42 is provided on the side thereof remote from the prime mover 44 with supporting hooks 48 which as illustrated in the drawings are adapted to engage the track rail 16 adjacent one end of the grinding machine 10, in order to hold the back lapping attachment 40 in proper relation to the reel of the lawn mower 22.

Mounted on the base plate 42 for movement in an arcuate path which lies concentric about the axis of the drive pulley 46 of the prime mover 44 is an arm 50 carrying at its end remote from the prime mover a drive spindle 52 to which is fixed for rotation therewith a relatively large drive wheel 54. Driving connection is established between the pulley 46 and the drive wheel 54 by means of a conventional endless belt 56. It will thus be seen that as the prime mover 44 is energized, the spindle 52 will rotate in unison therewith. Carried by the spindle adjacent the end thereof remote from the reel 54, is a flexible coupling 58 carrying a socket 60 which is adapted to engage and drive the reel shaft 62 of the reel of the lawn mower 22.

Carried by the base 42 and extending outwardly therefrom adjacent one end of the prime mover 44 is a bracket 64 carrying on its base remote from the prime mover 44, a laterally extending guide track 66, which is circular in contour with its periphery lying concentric about the axis of the pulley 46. The arm 50 is provided with a ring shaped guide 68 which encircles the guide track 66 and is provided in its inner periphery with an arcuate recess 70. A screw 72 is threadedly engaged in the guide track 66 with its periphery extending into the guide groove 70 to form a stop which will engage opposite ends of the groove 70 to limit the movement of the arm 50 about the axis of the pulley 46. The screw 72 also is provided with a head which when the screw is tightened engages the side of the ring 68 to lock the arm 50 in a selected position in its path of movement. By thus mounting the arm 50, it is obvious that when so desired the socket 60 may be moved downwardly and out of alignment with the reel shaft 62 so that the attachment need not interfere with the ordinary grinding of the reel blades 38.

By mounting the back lapping attachment 40 on the guide rail 16, it is obvious that the drive socket 60 will be in a position to be properly aligned with the drive shaft 62 of the reel of the lawn mower 22 simply by moving the arm 50 about the axis of the drive pulley 46 to its uppermost position in which the lower end of the groove 70 engages the screw 72, and upon tightening the screw, the arm 50 will be held in proper relation for rotating the reel of the lawn mower 22 for back lapping the blades 38. The entire operation may be carried on without removing the lawn mower 22 from its position on the grinding machine so that the grinding and back lapping of the blades 38 may progress without requiring the remounting of the lawn mower in the machine.

In the preferred form of the invention, the grinding machine is provided on the end of the frame with a suitable supporting bar 74 upon which the back lapping attachment is adapted to be hung when not in use as suggested in the dotted lines in Fig. 1.

While in the foregoing there has been shown and described the preferred embodiment of this invention, it is to be understood that minor changes in the details of the construction, combination and arrangement of parts may be resorted to without departing from the spirit and scope of the invention as claimed.

What is claimed is:

In a lawn mower sharpening machine of the type comprising an elongated track rail, a carriage mounted on the track rail to move longitudinally thereon, a grinding wheel carried by the carriage for movement therewith in a substantially rectilinear path having the periphery of the grinding wheel in contact with the blade of the reel of a lawn mower supported in an inverted position beneath the rectilinear path, a prime mover for said carriage operatively connected to said grinding wheel for rotation thereof and means carried by the carriage of the lawn mower accurately locating the reel thereof with relation to the grinding wheel and track rail, means for back lapping the edges of the blades of the reel of the lawn mower comprising a base, a prime mover having a drive shaft carried by said base, an arm carried by said base for movement in an arcuate path which lies concentric about said drive shaft of said last mentioned prime mover, speed reduction means carried by the arm remote from the last mentioned prime mover and operatively connected to said last mentioned prime mover for operation thereby at a speed less than the rotation of said grinding wheel, a socket carried by the speed reduction means for detachable driving connection with the reel of the lawn mower, and hooks carried by the base and detachably engaging the track rail for supporting the socket in axial alignment with the reel.

References Cited in the file of this patent

UNITED STATES PATENTS

| | | |
|---|---|---|
| 1,866,794 | Bierman | July 12, 1932 |
| 1,888,572 | Root | Nov. 22, 1932 |
| 1,967,118 | Glasgow | July 17, 1934 |
| 1,967,939 | Jenner | July 24, 1934 |
| 2,279,798 | Shelburne | Apr. 14, 1942 |
| 2,522,960 | Price | Sept. 19, 1950 |
| 2,572,530 | Smith | Oct. 23, 1951 |
| 2,598,069 | Pine | May 27, 1952 |